US011947274B2

(12) United States Patent
Tagawa et al.

(10) Patent No.: US 11,947,274 B2
(45) Date of Patent: Apr. 2, 2024

(54) ROLL MEMBER, CHARGING MEMBER, CHARGING DEVICE, PROCESS CARTRIDGE, AND IMAGE FORMING APPARATUS

(71) Applicant: FUJIFILM Business Innovation Corp., Tokyo (JP)

(72) Inventors: Yuki Tagawa, Kanagawa (JP); Takuya Yamamoto, Kanagawa (JP)

(73) Assignee: FUJIFILM Business Innovation Corp., Tokyo (JP)

( * ) Notice: Subject to any disclaimer, the term of this patent is extended or adjusted under 35 U.S.C. 154(b) by 0 days.

(21) Appl. No.: 18/189,215

(22) Filed: Mar. 24, 2023

(65) Prior Publication Data

US 2024/0061357 A1 Feb. 22, 2024

(30) Foreign Application Priority Data

Aug. 18, 2022 (JP) ................................ 2022-130599

(51) Int. Cl.
*G03G 15/02* (2006.01)

(52) U.S. Cl.
CPC ................................ *G03G 15/0233* (2013.01)

(58) Field of Classification Search
CPC .................................................. G03G 15/0233
USPC ........................................ 399/168, 174, 176
See application file for complete search history.

(56) References Cited

U.S. PATENT DOCUMENTS

| | | | | |
|---|---|---|---|---|
| 10,018,935 | B2 | 7/2018 | Ishida et al. | |
| 2007/0242964 | A1 * | 10/2007 | Yamaura | G03G 15/0233 399/176 |
| 2018/0181018 | A1 * | 6/2018 | Morishige | G03G 15/0233 |

FOREIGN PATENT DOCUMENTS

| | | | |
|---|---|---|---|
| JP | 2000 075595 | * | 3/2000 |
| JP | 2010002766 | | 1/2010 |
| JP | 2012 078518 | * | 4/2012 |
| JP | 2016085395 | | 5/2016 |
| JP | 2021096377 | | 6/2021 |

* cited by examiner

*Primary Examiner* — Hoan H Tran
(74) *Attorney, Agent, or Firm* — JCIPRNET

(57) ABSTRACT

A roll member includes: a conductive elastic layer that contains a fatty acid metal salt; and a surface layer that is provided on the conductive elastic layer and contains a filler, in which the surface layer includes a first layer provided on the conductive elastic layer side and a second layer provided immediately above the first layer, and a content of the filler in the first layer is less than a content of the filler in the second layer.

20 Claims, 2 Drawing Sheets

ROLL MEMBER, CHARGING MEMBER, CHARGING DEVICE, PROCESS CARTRIDGE, AND IMAGE FORMING APPARATUS

CROSS-REFERENCE TO RELATED APPLICATIONS

This application is based on and claims priority under 35 USC 119 from Japanese Patent Application No. 2022-130599 filed Aug. 18, 2022.

BACKGROUND

(i) Technical Field

The present invention relates to a roll member, a charging member, a charging device, a process cartridge, and an image forming apparatus.

(ii) Related Art

JP2010-002766A discloses "a charging member including: a substrate for charging a surface of an image carrier in an image forming apparatus; and an outermost layer that is provided on the substrate and is in contact with the image carrier, in which the outermost layer contains a polyamide resin that is cross-linked with at least one of an epoxy resin or an isocyanate resin, and a degree of crosslinking is 30% or more."

JP2016-085395A discloses "a conductive member for an electrophotographic apparatus, the member including: a conductive rubber elastic body layer that contains a cross-linked rubber and an ionic conductive agent; and a surface layer that is formed on an outer periphery of the conductive rubber elastic body layer, in which the surface layer contains a polymer and polyphenol."

JP2021-096377A discloses "a conductive roll for an electrophotographic apparatus, the conductive roll including: a shaft member; an elastic body layer that is formed on an outer peripheral surface of the shaft member; and a surface layer that is formed on an outer peripheral surface of the elastic body layer, in which at least one of the elastic body layer or the surface layer contains a component containing a halogen atom, at least one of the elastic body layer or the surface layer contains a polymer having an $NH_2$ group, and at least one of the elastic body layer or the surface layer contains an ion exchanger containing at least one of zirconium or bismuth as a metal component."

SUMMARY

Aspects of non-limiting embodiments of the present disclosure relate to a roll member including: a conductive elastic layer that contains a fatty acid metal salt; and a surface layer that is provided on the conductive elastic layer and contains a filler, in which, in a case where the roll member continuously rotates in a state where the roll member is pressed against another object, the formation of cracks in the surface layer is suppressed, as compared to a case where the surface layer has a single-layer structure or a case where the surface layer includes a first layer provided on the conductive elastic layer side and a second layer provided immediately above the first layer and a content of the filler in the first layer is more than a content of the filler in the second layer.

Aspects of certain non-limiting embodiments of the present disclosure address the above advantages and/or other advantages not described above. However, aspects of the non-limiting embodiments are not required to address the advantages described above, and aspects of the non-limiting embodiments of the present disclosure may not address advantages described above.

Configurations for achieving the objects include the following aspect.

According to an aspect of the present invention, there is provided a roll member including: a conductive elastic layer that contains a fatty acid metal salt; and a surface layer that is provided on the conductive elastic layer and contains a filler, in which the surface layer includes a first layer provided on the conductive elastic layer side and a second layer provided immediately above the first layer, and a content of the filler in the first layer is less than a content of the filler in the second layer.

BRIEF DESCRIPTION OF THE DRAWINGS

Exemplary embodiment(s) of the present invention will be described in detail based on the following figures, wherein.

DETAILED DESCRIPTION

Figure 1:
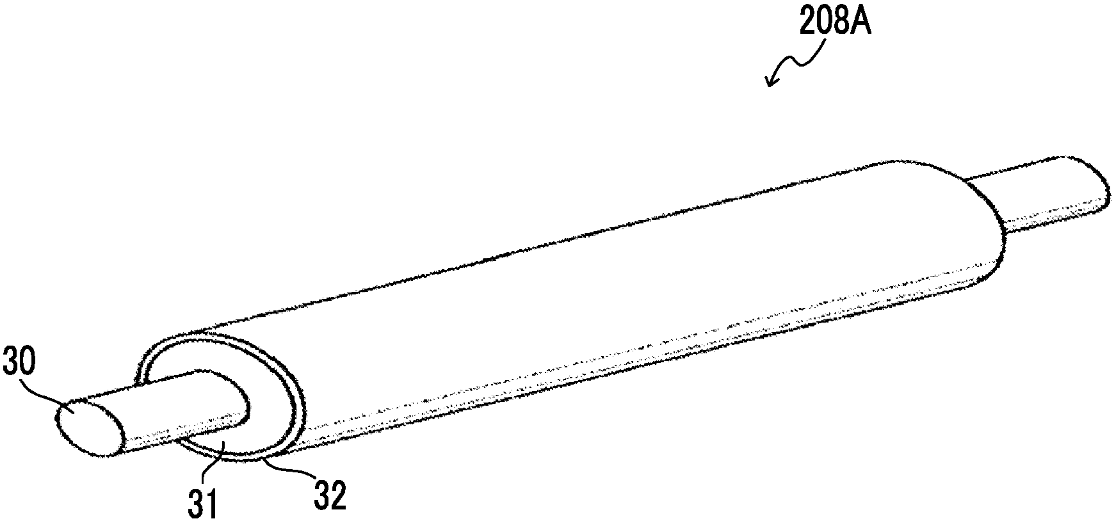
FIG. 1 is a schematic perspective view showing one example of a roll member according to the present exemplary embodiment.

Hereinafter, the present exemplary embodiment that is one example of the present invention will be described. The following description and Examples merely illustrate the present exemplary embodiment and do not limit the scope of the present invention.

An upper limit value or a lower limit value described in one numerical range described in a stepwise manner in the present specification may be replaced with an upper limit value or a lower limit value in another numerical range described in a stepwise manner. In addition, an upper limit value and a lower limit value in a numerical range described in the present specification may be replaced with a value described in Examples.

Each of components may include multiple kinds of corresponding materials.

In a case where the amount of each of components in a composition is described and multiple kinds of materials corresponding to the component are present, unless specified otherwise, the amount of the component refers to the total amount of the multiple kinds of materials present in the composition.

Roll Member

A roll member according to the present exemplary embodiment includes: a conductive elastic layer that contains a fatty acid metal salt; and a surface layer that is provided on the conductive elastic layer and contains a filler, in which the surface layer includes a first layer provided on the conductive elastic layer side and a second layer provided immediately above the first layer, and a content of the filler in the first layer is less than a content of the filler in the second layer.

In the roll member according to the present exemplary embodiment, with the above-described configuration, in a case where the roll member continuously rotates in a state where the roll member is pressed against another object, the formation of cracks in the surface layer is suppressed. The reason for this is presumed to be as follows.

Regarding the roll member including: a conductive elastic layer that contains a fatty acid metal salt; and a surface layer that is provided on the conductive elastic layer and contains a filler, in a case where the roll member continuously rotates in a state where the roll member is pressed against another object, cracks may be formed in the surface layer. The reason for this is presumed to be that, during the manufacturing of the roll member, the fatty acid metal salt in the conductive elastic layer inhibits the reaction during the formation of the surface layer.

In the roll member according to the present exemplary embodiment, the surface layer includes a first layer provided on the conductive elastic layer side and a second layer provided immediately above the first layer. That is, the first layer is provided between the conductive elastic layer and the second layer. Therefore, during the manufacturing of the roll member, the conductive elastic layer is covered with the first layer. Therefore, contact between the fatty acid metal salt and a material forming the second layer during the formation of the second layer is suppressed, and the fatty acid metal salt is not likely to inhibit the reaction during the formation of the second layer.

In addition, in the roll member according to the present exemplary embodiment, the content of the filler in the first layer is less than the content of the filler in the second layer. Since the first layer is in contact with the conductive elastic layer, the reaction during the formation of the first layer is inhibited. However, by adjusting the content of the filler in the first layer to be less than the content of the filler in the second layer, the formation of cracks caused by the filler is suppressed.

As a result, it is presumed that, in the roll member according to the present exemplary embodiment, in a case where the roll member continuously rotates in a state where the roll member is pressed against another object, the formation of cracks in the surface layer is suppressed.

Conductive Elastic Layer

Fatty Acid Metal Salt

The conductive elastic layer contains a fatty acid metal salt.

The fatty acid metal salt is a metal salt of a fatty acid.

The fatty acid metal salt contains a carboxylate anion of a fatty acid as an anion and contains a metal ion as a cation.

Examples of the carboxylate anion in the fatty acid metal salt include a carboxylate anion of a fatty acid having 4 or more and 24 or less carbon atoms.

Examples of the carboxylate anion include myristic acid, palmitic acid, and stearic acid.

Examples of the metal ion in the fatty acid metal salt include a transition metal ion, an alkali metal ion, and an alkaline earth metal ion.

Examples of the metal ion include a zinc ion.

The fatty acid metal salt is, for example, preferably zinc stearate.

The zinc stearate is more likely to inhibit the reaction during the formation of the surface layer. However, in the roll member according to the present exemplary embodiment, the surface layer includes the first layer and the second layer. Therefore, even in a case where the conductive elastic layer contains zinc stearate, in a case where the roll member continuously rotates in a state where the roll member is pressed against another object, the formation of cracks in the surface layer is suppressed.

Composition Other than Fatty Acid Metal Salt

In addition to the fatty acid metal salt, the conductive elastic layer contains, for example, an elastic material, a conductive agent, and other additives.

Examples of the elastic material include isoprene rubber, chloroprene rubber, epichlorohydrin rubber, butyl rubber, polyurethane, silicone rubber, fluororubber, styrene-butadiene rubber, butadiene rubber, nitrile rubber, ethylene propylene rubber, epichlorohydrin-ethylene oxide copolymer rubber, epichlorohydrin-ethylene oxide-allyl glycidyl ether copolymer rubber, ethyl ene-propyl ene-di ene terpolymer rubber (EPDM), acrylonitrile-butadiene copolymer rubber (NBR), natural rubber, and blended rubbers thereof. In particular, for example, polyurethane, silicone rubber, EPDM, epichlorohydrin-ethylene oxide copolymer rubber, epichlorohydrin-ethylene oxide-allyl glycidyl ether copolymer rubber, NBR, or blended rubbers thereof are preferable. These elastic materials may be foamed or unfoamed.

Examples of the conductive agent include an electronic conductive agent and an ionic conductive agent. Examples of the electronic conductive agent include carbon black such as Ketjen black or acetylene black; pyrolytic carbon or graphite; various conductive metals or alloys such as aluminum, copper, nickel, or stainless steel; conductive metal oxides such as tin oxide, indium oxide, titanium oxide, tin oxide-antimony oxide solid solution, or tin oxide-indium oxide solid solution; and an insulating material having a surface that is treated to be conductive. Examples of the ionic conductive agent include perchlorates or chlorates of oniums such as tetraethylammonium or lauryltrimethylammonium; and perchlorates or chlorates of alkali metals or alkali earth metals such as lithium or magnesium. The conductive agents may be used alone or in combination of two or more kinds.

Specific examples of the carbon black include "SPECIAL BLACK 350", "SPECIAL BLACK 100", "SPECIAL BLACK 250", "SPECIAL BLACK 5", "SPECIAL BLACK 4", "SPECIAL BLACK 4A", "SPECIAL BLACK 550", "SPECIAL BLACK 6", "COLOR BLACK FW200", "COLOR BLACK FW2", and "COLOR BLACK FW2V" manufactured by Orion Engineered Carbons S.A. and "MONARCH 880", "MONARCH 1000", "MONARCH 1300", "MONARCH 1400", "MOGUL-L", and "REGAL 400R" manufactured by Cabot Corporation.

The blending amount of the conductive agent is not particularly limited and, in the case of the electronic conductive agent, is desirably in a range of 1 part by mass or more and 30 parts by mass or less and more preferably in a range of 15 parts by mass or more and 25 parts by mass or less with respect to 100 parts by mass of the elastic material. The blending amount of the ionic conductive agent is, for example, desirably in a range of 0.1 parts by mass or more and 5.0 parts by mass or less and more preferably in a range of 0.5 parts by mass or more and 3.0 parts by mass or less with respect to 100 parts by mass of the elastic material.

Examples of other additives that are blended in the conductive elastic layer include typical materials that are blended in the conductive elastic layer, for example, a softener, a plasticizer, a curing agent, a vulcanizing agent, a vulcanization accelerator, an antioxidant, a surfactant, a coupling agent, and a filler (for example, silica or calcium carbonate).

Film Thickness and Volume Resistivity

The average thickness of the conductive elastic layer is, for example, desirably about 1 mm or more and 15 mm or less and more preferably about 2 mm or more and 10 mm or less.

The volume resistivity of the conductive elastic layer is, for example, preferably $10^3$ Ωcm or higher and $10^{14}$ Ωcm or lower.

Method of Forming Conductive Elastic Layer

Examples of a method of forming the conductive elastic layer include: a method in which both of a composition for forming an elastic layer where a fatty acid as a processing aid, zinc oxide as a vulcanization accelerator, an elastic material, a conductive agent, and other additives are mixed and a cylindrical conductive substrate are extruded from an extruder to form a layer of the composition for forming an elastic layer on an outer peripheral surface of the conductive substrate and subsequently the layer of the composition for forming an elastic layer is heated to form the elastic layer through a cross-linking reaction; and a method in which a composition for forming an elastic layer where an elastic material, a conductive agent, and other additives are mixed is extruded from an extruder to an outer peripheral surface of an endless belt-shaped conductive substrate to form a layer of the composition for forming an elastic layer on the outer peripheral surface of the conductive substrate and subsequently the layer of the composition for forming an elastic layer is heated to form the elastic layer through a cross-linking reaction.

Surface Layer

The surface layer is provided on the conductive elastic layer and contains a filler.

In addition, the surface layer includes the first layer provided on the conductive elastic layer side and the second layer provided immediately above the first layer, and the content of the filler in the first layer is less than the content of the filler in the second layer.

Composition of First Layer

It is preferable that the first layer contains, for example a binder resin.

Examples of the binder resin include an acrylic resin, a fluorine-modified acrylic resin, a silicone-modified acrylic resin, a cellulose resin, a polyamide resin, copolymer nylon, a polyurethane resin, a polycarbonate resin, a polyester resin, a polyimide resin, an epoxy resin, a silicone resin, a polyvinyl alcohol resin, a polyvinyl butyral resin, a polyvinyl acetal resin, an ethylene tetrafluoroethylene resin, a melamine resin, a polyethylene resin, a polyvinyl resin, a polyarylate resin, a polythiophene resin, a polyethylene terephthalate (PET) resin, and a fluororesin (for example, a polyvinylidene fluoride resin, a polytetrafluoroethylene resin, a tetrafluoroethylene-perfluoroalkyl vinyl ether copolymer (PFA), or a tetrafluoroethylene-hexafluoropropylene copolymer (FEP)). In addition, examples of the binder resin include a binder resin obtained by curing or cross-linking a curable resin using a curing agent or a catalyst.

For example, it is preferable that the binder resin in the first layer is a polyamide resin, and it is preferable that the binder resin in the first layer contains a cross-linked product of a cross-linkable nylon.

The cross-linked product of the cross-linkable nylon is a cross-linked product obtained by cross-linking a cross-linkable functional group in the cross-linkable nylon and an amide group in the cross-linkable nylon.

The cross-linkable nylon is a nylon having a cross-linkable functional group.

The cross-linkable functional group is not particularly limited as long as the cross-linkable functional group is a functional group cross-linkable with an amide group in the cross-linkable nylon.

Examples of the cross-linkable functional group include an alkoxyalkyl group.

From the viewpoint of suppressing the formation of cracks in the surface layer in a case where the roll member continuously rotates in a state where the roll member is pressed against another object, the cross-linkable functional group is, for example, preferably an alkoxyalkyl group.

The alkoxyalkyl group is a group represented by $—R^1—OR^2$.

$R^1$ represents an alkylene group, and $R^2$ represents an alkyl group.

Here, the alkylene group is a group represented by $—(C_nH_{2n})—$.

$R^1$ represents, for example, preferably an alkylene group having 1 or more and 30 or less carbon atoms, more preferably an alkylene group having 1 or more and 15 or less carbon atoms, still more preferably an alkylene group having 1 or more and 8 or less carbon atoms, particularly preferably an alkylene group having 1 or more and 3 or less carbon atoms, and most preferably an alkylene group (methylene group) having 1 carbon atom.

$R^2$ represents, for example, preferably an alkyl group having 1 or more and 30 or less carbon atoms, more preferably an alkyl group having 1 or more and 15 or less carbon atoms, still more preferably an alkyl group having 1 or more and 8 or less carbon atoms, particularly preferably an alkyl group having 1 or more and 3 or less carbon atoms, and most preferably an alkyl group (methyl group) having 1 carbon atom.

That is, an alkoxymethyl group is, for example, most preferably a methoxymethyl group.

The cross-linkable functional group is, for example, preferably a methoxymethyl group.

That is, the cross-linkable nylon is, for example, preferably methoxymethylated nylon.

Here, the methoxymethylated nylon refers to a compound in which a hydrogen atom in at least a part of amide groups in nylon is substituted with a methoxymethyl group.

From the viewpoint of further suppressing the formation of cracks in the surface layer of the roll member in a case where the roll member continuously rotates in a state where the roll member is pressed against another object, the weight-average molecular weight of the methoxymethylated nylon is, for example, preferably 10000 or higher and 100000 or lower, more preferably 15000 or higher and 50000 or lower, and still more preferably 20000 or higher and 40000 or lower.

The weight-average molecular weight of the methoxymethylated nylon is a value measured by gel permeation chromatography (GPC) under the following measurement conditions.

Column: KF-404 (product name, manufactured by Resonac Corporation)

Column temperature: 25° C.

Eluent: HFIP

Flow rate: 0.5 mL/min

Detector: a differential refractive index detector (RID)

The first layer may contain a binder resin other than the cross-linked product of the cross-linkable nylon.

Examples of the binder resin include a urethane resin, polyester, phenol, acryl, polyurethane, an epoxy resin, and cellulose.

The first layer may contain a filler.

Examples of the filler include inorganic particles and organic particles.

Specific examples of the filler include: inorganic particles such as silica particles, alumina particles, or zircon ($ZrSiO_4$) particles; and resin particles such as polyamide particles, fluororesin particles, or silicone resin particles.

The volume-average particle size of the filler is, for example, preferably 5 μm or more and 20 μm or less, more preferably 7 μm or more and 15 μm or less, and still more preferably 10 μm or more and 15 μm or less.

As a method of measuring the volume-average particle size of the filler, the volume-average particle size is calculated by observing a sample cut from the layer with an electron microscope, measuring diameters (maximum diameters) of 100 particles, and obtaining a volume average value of the diameters.

In the roll member according to the present exemplary embodiment, the content of the filler in the first layer is less than the content of the filler in the second layer.

The content of the filler in the first layer, for example, with respect to the content of the filler in the second layer (that is, [the content of the filler in the first layer÷the content of the filler in the second layer]×100) is preferably less than 50 mass %, more preferably 0 mass % or more and less than 25 mass %, still more preferably 0 mass % or more and less than 5 mass %, and particularly preferably 0 mass %.

By adjusting the content of the filler in the first layer to be less than 50 mass % with respect to the content of the filler in the second layer, in a case where the roll member continuously rotates in a state where the roll member is pressed against another object, the formation of cracks in the surface layer is further suppressed. The reason for this is presumed to be as follows.

By adjusting the content of the filler in the first layer to be less than 50 mass % with respect to the content of the filler in the second layer, the content of the filler in the second layer is further suppressed such that the formation of cracks caused by the filler is further suppressed.

The content of the filler in the first layer, for example, with respect to the total mass of the first layer is preferably 0 mass % or more and 20 mass % or less, more preferably 0 mass % or more and 10 mass % or less, and particularly preferably 0 mass %.

The first layer may contain a conductive agent.

Examples of the conductive agent in the first layer include a conductive agent having a volume-average particle size of 3 μm or less and a volume resistivity of $10^9$ Ωcm or lower.

A method of measuring the volume-average particle size of the conductive agent is the same as the method of measuring the volume-average particle size of the filler.

In a method of measuring the volume resistivity of the conductive agent, a layer of the conductive agent is formed on a pair of 20 $cm^2$ circular polar plates connected to an electrometer (KEITHLEY 610C, manufactured by Tektronix, Inc.) and a high voltage power supply (trade name: FLUKE 415B, manufactured by Fluke Corporation), an upper polar plate is disposed on the layer, and the thickness of the conductive agent layer is measured in a state where a 4 kg weight is placed to remove voids in the conductive agent. Next, a voltage of 1000 V is applied to both of the polar plates to measure a current value, and a volume resistivity ρ is calculated by Expression $\rho=V\times S/\{(A-A_0)\times d\}$. V represents the applied voltage, S represents the area of the polar plates, A represents the measured voltage, $A_0$ represents an initial current value in a case where the applied voltage is 0 V, and d represents the thickness of the conductive agent layer.

Examples of the conductive agent include an electronic conductive agent and an ionic conductive agent. Examples of the electronic conductive agent include carbon black such as Ketjen black or acetylene black; pyrolytic carbon or graphite; various conductive metals or alloys such as aluminum, copper, nickel, or stainless steel; conductive metal oxides such as tin oxide, indium oxide, titanium oxide, tin oxide-antimony oxide solid solution, or tin oxide-indium oxide solid solution; and an insulating material having a surface that is treated to be conductive. Examples of the ionic conductive agent include perchlorates or chlorates of oniums such as tetraethylammonium or lauryltrimethyl ammonium; and perchlorates or chlorates of alkali metals or alkali earth metals such as lithium or magnesium. The conductive agents may be used alone or in combination of two or more kinds.

As the conductive agent, for example, carbon black is suitable.

Examples of the carbon black include Ketjen black, acetylene black, and oxidized carbon black having a pH of 5 or less. More specific examples of the carbon black include "SPECIAL BLACK 350", "SPECIAL BLACK 100", "SPECIAL BLACK 250", "SPECIAL BLACK 5", "SPECIAL BLACK 4", "SPECIAL BLACK 4A", "SPECIAL BLACK 550", "SPECIAL BLACK 6", "COLOR BLACK FW200", "COLOR BLACK FW2", and "COLOR BLACK FW2V" manufactured by Orion Engineered Carbons S.A. and "MONARCH 880", "MONARCH 1000", "MONARCH 1300", "MONARCH 1400", "MOGUL-L", and "REGAL 400R" manufactured by Cabot Corporation.

In a case where the first layer contains the conductive agent, the content of the conductive agent with respect to 100 parts by mass of the binder resin is, for example, preferably 3 parts by mass or more and 25 parts by mass or less, more preferably 5 parts by mass or more and 20 parts by mass or less, and still more preferably 10 parts by mass or more and 15 parts by mass or less.

Composition of Second Layer

It is preferable that the second layer contains, for example a binder resin.

The binder resin in the second layer has the same definition as the binder resin in the first layer.

For example, it is preferable that the binder resin in the second layer is a polyamide resin, and it is preferable that the binder resin in the second layer contains a cross-linked product of a cross-linkable nylon.

The cross-linked product of the cross-linkable nylon in the second layer has the same definition as the cross-linked product of the cross-linkable nylon in the first layer. In addition, an aspect of the cross-linked product of the cross-linkable nylon in the second layer is the same as the aspect of the cross-linked product of the cross-linkable nylon in the first layer.

The second layer contains a filler.

The filler in the second layer has the same definition as the filler in the first layer. In addition, the kind and the volume-average particle size of the filler in the second layer are the same as the kind and the volume-average particle size of the filler in the first layer.

In the roll member according to the present exemplary embodiment, the content of the filler in the second layer is more than the content of the filler in the first layer.

The content of the filler in the second layer, for example, with respect to the total mass of the second layer is preferably 4 mass % or more and 20 mass % or less, more preferably 6 mass % or more and 18 mass % or less, and still more preferably 8 mass % or more and 16 mass % or less.

The second layer may contain a conductive agent.

The conductive agent in the second layer has the same definition as the conductive agent in the first layer. In addition, the kind and the content of the conductive agent in the second layer are the same as the kind and the content of the conductive agent in the first layer.

Relationship in Physical Property Values Between First Layer and Second Layer

Degree of Crosslinking

It is preferable that a degree of crosslinking defined by Expression (1) is, for example, 0.3 or more and 0.7 or less in the second layer and is 0.1 or more and 0.5 or less in the first layer.

the degree of crosslinking=an absorbance at 1078 $cm^{-1}$÷an absorbance at 2935 $cm^{-1}$    Expression (1):

By adjusting the degree of crosslinking of the second layer to be 0.3 or more and 0.7 or less and adjusting the degree of crosslinking of the first layer to be 0.1 or more and 0.5 or less, in a case where the roll member continuously rotates in a state where the roll member is pressed against another object, the formation of cracks in the surface layer is further suppressed. The reason for this is presumed to be as follows.

The degree of crosslinking represents the degree of cross-linking of the cross-linked product of the cross-linkable nylon in the first layer and the second layer, and as the degree of crosslinking decreases, the cross-linking further progresses. By adjusting the degree of crosslinking of the second layer to be 0.3 or more and adjusting the degree of crosslinking of the first layer to be 0.1 or more, degradation of the cross-linked product of the cross-linkable nylon is suppressed in the surface layer, and in a case where the roll member continuously rotates in a state where the roll member is pressed against another object, the formation of cracks in the surface layer is further suppressed. In addition, by adjusting the degree of crosslinking of the second layer to be 0.7 or less and adjusting the degree of crosslinking of the first layer to be 0.5 or less, the cross-linking further progresses in the cross-linked product of the cross-linkable nylon, and in a case where the roll member continuously rotates in a state where the roll member is pressed against another object, the formation of cracks in the surface layer is further suppressed.

From the viewpoint of suppressing the formation of cracks in the surface layer, the degree of crosslinking of the second layer is, for example, more preferably 0.4 or more and 0.7 or less and still more preferably 0.5 or more and 0.7 or less.

From the viewpoint of suppressing the formation of cracks in the surface layer, the degree of crosslinking of the first layer is, for example, more preferably 0.1 or more and 0.4 or less and still more preferably 0.1 or more and 0.3 or less.

The degree of crosslinking is calculated in the following procedure.

A measurement sample having a thickness of 2 mm is cut from the surface layer. By using the measurement sample as a measurement target, regions including wave numbers of 1078 cm-1 and 2935 cm-1 are measured using an infrared spectrophotometer (product name: NICOLET 6700, manufactured by THERMO ELECTRON Co., Ltd.). Baseline correction in an offset portion or the like where absorbed light is not present is performed, and the absorbances of the wave numbers 1078 $cm^{-1}$ and 2935 $cm^{-1}$ are obtained. Each of the absorbances is substituted into Expression (1) to calculate the degree of crosslinking.

For example, it is preferable that the degree of crosslinking defined by Expression (1) in the first layer is less than the degree of crosslinking defined by Expression (1) in the second layer.

By adjusting the degree of crosslinking of the first layer to be less than the degree of crosslinking of the second layer, in a case where the roll member continuously rotates in a state where the roll member is pressed against another object, the formation of cracks in the surface layer is further suppressed. The reason for this is presumed to be as follows.

By adjusting the degree of crosslinking of the first layer to be less than the degree of crosslinking of the second layer, the cross-linking in the cross-linked product of the cross-linkable nylon in the first layer further progresses as compared to the second layer. Therefore, the strength of the entire surface layer is improved. In addition, by adjusting the degree of crosslinking of the first layer to be less than the degree of crosslinking of the second layer, the degradation of the cross-linked product of the cross-linkable nylon progresses in the first layer. However, since the content of the filler in the first layer is less than the content of the filler in the second layer, the formation of cracks caused by the filler is suppressed, and thus a decrease in strength is suppressed.

A ratio of the degree of crosslinking of the first layer to the degree of crosslinking of the second layer (the degree of crosslinking of the first layer/the degree of crosslinking of the second layer) is, for example, preferably 1.2 or more and 4 or less, more preferably 1.3 or more and 2 or less, and still more preferably 1.5 or more and 1.8 or less.

Thermal Degradation Index

It is preferable that a thermal degradation index defined by Expression (2) in the first layer is, for example, less than a thermal degradation index defined by Expression (2) in the second layer.

the thermal degradation index=an absorbance at 1638 $cm^{-1}$÷an absorbance at 1543 $cm^{-1}$    Expression (2):

By adjusting the thermal degradation index of the first layer to be less than the thermal degradation index of the second layer, in a case where the roll member continuously rotates in a state where the roll member is pressed against another object, the formation of cracks in the surface layer is further suppressed. The reason for this is presumed to be as follows.

The thermal degradation index represents the degree of degradation of the cross-linked product of the cross-linkable nylon in the first layer and the second layer, and as the thermal degradation index decreases, the degradation further progresses. In addition, by adjusting the thermal degradation index of the first layer to be less than the thermal degradation index of the second layer, the degradation in the cross-linked product of the cross-linkable nylon in the second layer is suppressed. Therefore, the strength of the entire surface layer is improved. In addition, the degradation in the cross-linked product of the cross-linkable nylon in the first layer further progresses as compared to the cross-linked product of the cross-linkable nylon in the second layer. However, since the content of the filler in the first layer is less than the content of the filler in the second layer, the formation of cracks caused by the filler is suppressed, and thus a decrease in strength is suppressed.

The thermal degradation index is calculated in the following procedure.

A measurement sample having a thickness of 2 mm is cut from the surface layer. By using the measurement sample as a measurement target, regions including wave numbers of 1638 $cm^{-1}$ and 1543 $cm^{-1}$ are measured using an infrared spectrophotometer (product name: NICOLET 6700, manufactured by THERMO ELECTRON Co., Ltd.). Baseline correction in an offset portion or the like where absorbed light is not present is performed, and the absorbances of the wave numbers 1638 $cm^{-1}$ and 1543 $cm^{-1}$ are obtained. Each of the absorbances is substituted into Expression (2) to calculate the degree of crosslinking.

The thermal degradation index of the first layer is, for example, preferably 2.0 or more and 2.2 or less, more preferably 2.02 or more and 2.18 or less, and still more preferably 2.04 or more and 2.16 or less.

By adjusting the thermal degradation index of the first layer to be 2.0 or more and 2.2 or less, in a case where the roll member continuously rotates in a state where the roll member is pressed against another object, the formation of cracks in the surface layer is further suppressed. The reason for this is presumed to be as follows.

By adjusting the thermal degradation index of the first layer to be 2.0 or more and 2.2 or less, degradation of the cross-linked product of the cross-linkable nylon is suppressed, and a decrease in the strength of the surface layer is suppressed.

From the viewpoint of suppressing the formation of cracks in the surface layer, the thermal degradation index of the second layer is, for example, preferably 2.1 or more and 2.3 or less, more preferably 2.12 or more and 2.28 or less, and still more preferably 2.14 or more and 2.26 or less.

Thicknesses of First Layer and Second Layer

A ratio of a thickness of the first layer to a thickness of the second layer (the thickness of the first layer/the thickness of the second layer) is, for example, preferably 0.5 or more and 2.0 or less, more preferably 0.6 or more and 1.8 or less, and still more preferably 0.7 or more and 1.5 or less.

By adjusting the ratio of the thickness of the first layer to the thickness of the second layer (the thickness of the first layer/the thickness of the second layer) to be 0.5 or more and 2.0 or less, in a case where the roll member continuously rotates in a state where the roll member is pressed against another object, the formation of cracks in the surface layer is further suppressed. The reason for this is presumed to be as follows.

By adjusting the ratio of the thickness of the first layer to the thickness of the second layer (the thickness of the first layer/the thickness of the second layer) to be 0.5 or more, contact between the fatty acid metal salt and a material forming the second layer during the formation of the second layer is further suppressed, and the fatty acid metal salt is not likely to inhibit the reaction during the formation of the second layer.

By adjusting the ratio of the thickness of the first layer to the thickness of the second layer (the thickness of the first layer/the thickness of the second layer) to be 2.0 or less, an uneven shape of the surface can be formed using the filler.

The thickness of the first layer and the thickness of the second layer are measured as follows.

The surface layer is cut in a thickness direction, and the cut surface is observed with a scanning electron microscope (SEM) to measure the thickness of the first layer and the thickness of the second layer.

From the viewpoint of suppressing the formation of cracks in the surface layer, the thickness of the first layer is, for example, preferably 1 μm or more and 9 μm or less, more preferably 2 μm or more and 8 μm or less, and still more preferably 3 μm or more and 7 μm or less.

The total thickness of the surface layer is, for example, preferably 3 μm or more and 25 μm or less, more preferably 5 μm or more and 20 μm or less, and still more preferably 6 μm or more and 15 μm or less.

Method of Forming Surface Layer

It is preferable that a method of forming the surface layer includes, for example: forming a first layer precursor layer by applying a composition for forming a first layer to the conductive elastic layer to obtain a coating film, drying the coating film to obtain a dry film, and calcinating the dry film (first layer forming step); and forming the surface layer including the first layer and the second layer by applying a composition for forming a second layer to the first layer precursor layer to obtain a coating film, drying the coating film to obtain a dry film, and calcinating the dry film (second layer forming step).

The composition for forming a first layer contains the binder resin and optionally may further contain the filler and the conductive agent.

The composition for forming a second layer contains the binder resin and the filler optionally may further contain the conductive agent.

In a case where the composition for forming a first layer contains the filler, for example, the content of the filler in the composition for forming a first layer (that is, the content of the filler in the composition for forming a first layer with respect to the total mass of the composition for forming a first layer) is preferably less than the content of the filler in the composition for forming a second layer (that is, the content of the filler in the composition for forming a second layer with respect to the total mass of the composition for forming a second layer).

As a method of applying the composition for forming a first layer and the composition for forming a second layer, a typical method such as a roll coating method, a blade coating method, a wire bar coating method, a spray coating method, a dip coating method, a bead coating method, an air knife coating method, or a curtain coating method can be used.

Conductive Substrate

The roll member according to the present exemplary embodiment may include the conductive substrate.

The conductive substrate is a cylindrical or columnar member, and the conductivity described herein refers to a volume resistivity of lower than $10^{13}$ Ωcm.

Examples of a material of the substrate include metal such as iron (for example, free-cutting steel), copper, brass, stainless steel, aluminum, or nickel. Examples of the substrate include a member (for example, a resin or ceramic member) where an outer peripheral surface is plated and a member (for example, a resin or ceramic member) where a conductive agent is dispersed.

Shape and the Like of Roll Member

The shape of the roll member according to the present exemplary embodiment is not particularly limited and is preferably a shape shown in FIG. 1.

FIG. 1 is a schematic perspective view showing one example of the roll member according to the present exemplary embodiment.

As shown in FIG. 1, for example, a roll member 208A according to the present exemplary embodiment may include: a shaft 30 (an example of the conductive substrate); a conductive elastic layer 31 provided on an outer peripheral surface of the shaft 30, and a surface layer 32 provided on an outer peripheral surface of the conductive elastic layer 31.

In addition, the roll member according to the present exemplary embodiment may have a configuration in which, for example, an adhesive layer (primer layer) that is provided between the conductive substrate and the conductive elastic layer or a coating layer (protective layer) that is provided on an outer side (outer surface) of the surface layer is provided.

Use of Roll Member

The roll member according to the present exemplary embodiment is used for, for example, a charging roll (hereinafter, also referred to as "charging member") for charging a surface of the image carrier in an electrophotographic copier, an electrostatic printer, or the like, a transfer roll for transferring a toner image formed on the image carrier to a transfer medium, a toner transport roll for transporting toner to the image carrier, a conductive roll for power feeding or driving in combination with a conductive belt that electrostatically transports paper, or a cleaning roll for removing toner on the image carrier. In addition, in an ink jet type image forming apparatus, for example, a charging roll for charging an intermediate transfer medium before discharging ink from an ink jet head is used.

Charging Member, Charging Device, Image Forming Apparatus, and Process Cartridge It is preferable that the charging member according to the present exemplary embodiment consists of, for example, the roll member according to the present exemplary embodiment.

By using the roll member according to the present exemplary embodiment as the charging member according to the present exemplary embodiment, the durability of the charging member is improved, and the occurrence of image defects caused by cracks in the surface layer is suppressed even after long-term use.

A charging device according to the present exemplary embodiment includes the charging member according to the present exemplary embodiment.

It is preferable that the charging device according to the present exemplary embodiment includes, for example, the charging member according to the present exemplary embodiment, in which an image carrier is charged using a contact charging method.

A contact width of the charging member with the image carrier in a circumferential direction (that is, a width of the charging member in the circumferential direction in a region where the image carrier and the charging member are in contact with each other) is not particularly limited and is, for example, in a range of 0.5 mm or more and 5 mm or less and preferably in a range of 1 mm or more and 3 mm or less.

A process cartridge according to the present exemplary embodiment includes, for example, a charging device that is attached to and detached from an image forming apparatus having a configuration described below and charges a surface of the image carrier. As the charging device, the charging device according to the present exemplary embodiment is applied.

Optionally, the process cartridge according to the present exemplary embodiment may further include, for example, at least one kind selected from the group consisting of an image carrier, an electrostatic latent image forming device that forms an electrostatic latent image on the charged surface of the image carrier, a developing device that develops the latent image formed on the surface of the image carrier with toner to form a toner image, a transfer device that transfers the toner image formed on the surface of the image carrier to a recording medium, and a cleaning device that cleans the surface of the image carrier.

The image forming apparatus according to the present exemplary embodiment includes: an image carrier; a charging device that charges a surface of the image carrier; an electrostatic latent image forming device that forms an electrostatic latent image on the charged surface of the image carrier; a developing device that develops the electrostatic latent image formed on the surface of the image carrier with a developer containing toner to form a toner image; and a transfer device that transfers the toner image to a surface of a recording medium. As the charging device, the charging device according to the present exemplary embodiment is applied.

Next, the image forming apparatus and the process cartridge according to the present exemplary embodiment will be described with reference to the drawings.

Figure 2:
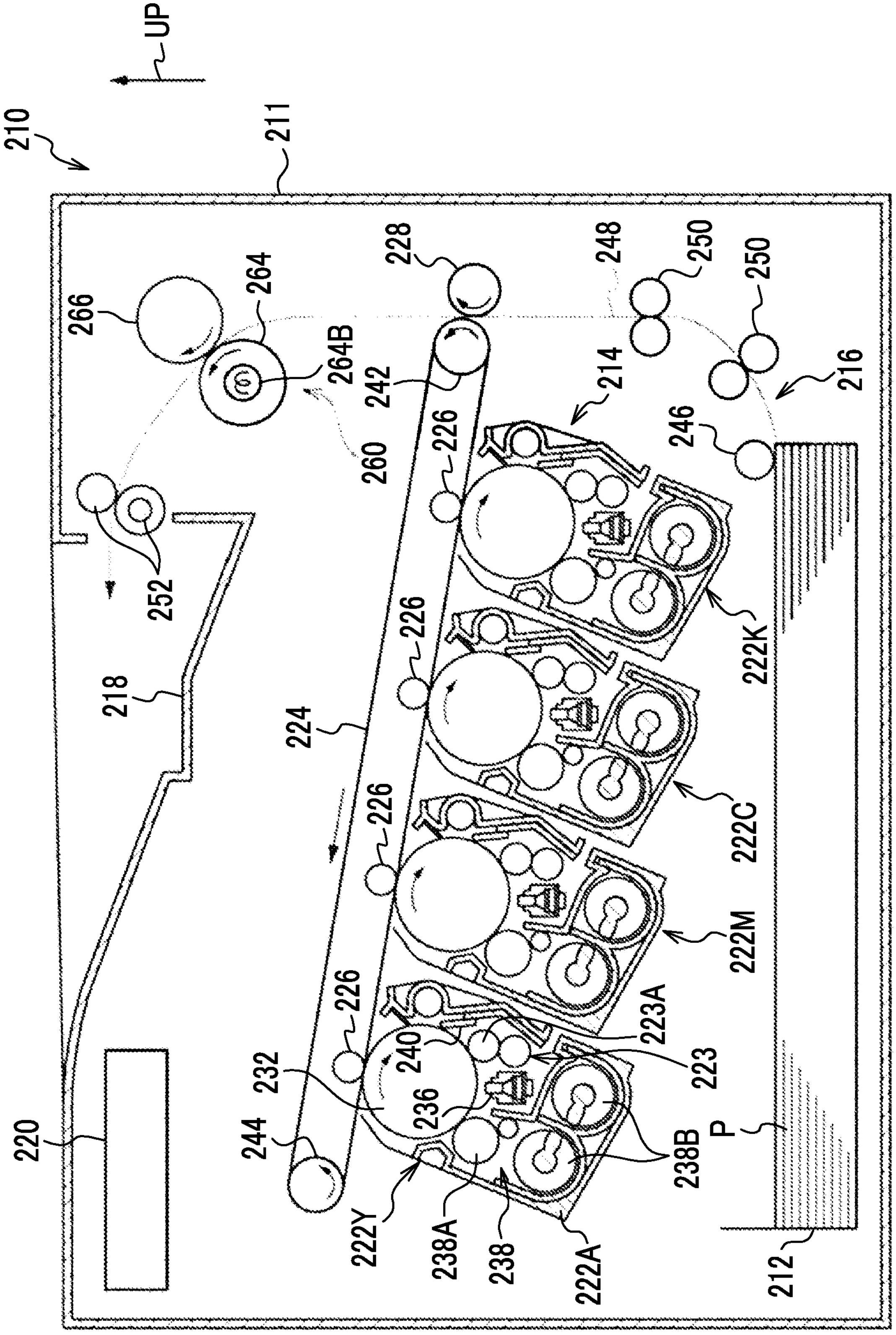
FIG. 2 is a schematic configuration diagram showing one example of an image forming apparatus according to the present exemplary embodiment.

FIG. 2 is a schematic configuration diagram showing the image forming apparatus according to the present exemplary embodiment. Arrow UP shown in the drawing indicates an upward side in the vertical direction.

As shown in FIG. 2, an image forming apparatus 210 includes an image forming apparatus body 211 that accommodates each of the components. In the image forming apparatus body 211, an accommodation portion 212 that accommodates a recording medium P such as paper, an image forming portion 214 that forms an image on the recording medium P, a transport portion 216 that transports the recording medium P from the accommodation portion 212 to the image forming portion 214, and a controller 220 that controls an operation of each of the portions of the image forming apparatus 210 are provided. In addition, a discharge portion 218 to which the recording medium P on which the image is formed by the image forming portion 214 is discharged is provided above the image forming apparatus body 211.

The image forming portion 214 includes: image forming units 222Y, 222M, 222C, and 222K (hereinafter referred to as "222Y to 222K") that form toner images of colors including yellow (Y), magenta (M), cyan (C), and black (K), respectively; an intermediate transfer belt 224 (an example of a transfer target) to which the toner images formed by the image forming units 222Y to 222K are transferred; a first transfer roll 226 (an example of a transfer roll) that transfers the toner images formed by the image forming units 222Y to 222K to the intermediate transfer belt 224; and a second transfer roll 228 (an example of a transfer member) that transfers the toner images transferred to the intermediate transfer belt 224 by the first transfer roll 226 from the intermediate transfer belt 224 to the recording medium P. The image forming unit 214 is not limited to the above-described configuration and may adopt another configuration as long as an image can be formed on the recording medium P (an example of a transfer target).

Here, a unit consisting of the intermediate transfer belt 224, the first transfer roll 226, and the second transfer roll 228 corresponds to an example of the transfer device. This unit may be configured as a cartridge (process cartridge).

The image forming units 222Y to 222K are disposed side by side in a center portion in a vertical direction of the image forming apparatus 210 in a state where the image forming units 222Y to 222K are inclined with respect to a horizontal direction. In addition, each of the image forming units 222Y to 222K includes a photoreceptor 232 (an example of the image carrier) that rotates in one direction (for example, a clockwise direction in FIG. 2). The image forming units 222Y to 222K have the same configuration. Therefore, reference numerals of the units of the image forming units 222M, 222C, and 222K are not shown in FIG. 2.

In the vicinity of each of the photoreceptors 232, in order from the upstream side in the rotation direction of the photoreceptor 232, a charging device 223 including a charging roll 223A (an example of a charging member) that charges the photoreceptor 232, an exposure device 236 (an example of the electrostatic latent image forming device) that exposes the photoreceptor 232 charged by the charging device 223 to form an electrostatic latent image on the photoreceptor 232, a developing device 238 that develops the latent image formed on the photoreceptor 232 by the exposure device 236 to form a toner image, and a removal member (for example, a cleaning blade) 240 that comes into contact with the photoreceptor 232 and removes toner remaining on the photoreceptor 232 are provided.

Here, the photoreceptor 232, the charging device 223, and the exposure device 236, the developing device 238, and the removal member 240 are integrally held by a housing (case) 222A to configure a cartridge (process cartridge).

As the exposure device 236, a self-scanning LED print head is applied. The exposure device 236 may be an optical exposure device that exposes the photoreceptor 232 from a light source through a polygon mirror.

The exposure device 236 forms a latent image based on an image signal transmitted from the controller 220. Examples of the image signal transmitted from the controller 220 include an image signal acquired from an external device by the controller 220.

The developing device 238 includes: a developer supply member 238A that supplies a developer to the photoreceptor 232; and a plurality of transport members 238B that transport the developer given to the developer supply member 238A while agitating the developer.

The intermediate transfer belt 224 is formed in an annular shape and is disposed above the image forming units 222Y to 222K. On an inner peripheral side of the intermediate transfer belt 224, winding rolls 242 and 244 around which the intermediate transfer belt 224 is wound are provided. Any one of the winding rolls 242 and 244 rotates such that intermediate transfer belt 224 circulates and moves (rotates) in one direction (for example, a counterclockwise direction in FIG. 2) while being in contact with the photoreceptor 232. The winding roll 242 is a configured as a facing roll that faces the second transfer roll 228.

The first transfer roll 226 faces the photoreceptor 232 with the intermediate transfer belt 224 interposed between the first transfer roll 226 and the photoreceptor 232. A position between the first transfer roll 226 and the photoreceptor 232 is a first transfer position at which the toner image formed on the photoreceptor 232 is transferred to the intermediate transfer belt 224.

The second transfer roll 228 faces the winding roll 242 with the intermediate transfer belt 224 interposed between the second transfer roll 228 and the winding roll 242. A position between the second transfer roll 228 and the winding roll 242 is a second transfer position at which the toner image transferred to the intermediate transfer belt 224 is transferred to the recording medium P.

In the transport portion 216, a feed roll 246 that feeds the recording medium P accommodated in the accommodation portion 212, a transport path 248 through which the recording medium P fed by the feed roll 246 is transported, and a plurality of transport rolls 250 that are provided along the transport path 248 and transport the recording medium P fed by the feed roll 246 to the second transfer position are provided.

A fixing device 260 that fixes the toner image formed on the recording medium P by the image forming unit 214 to the recording medium P is provided downstream of the second transfer position in the transport direction.

In the fixing device 260, a heating roll 264 that heats the image on the recording medium P and a pressurization roll 266 that is an example of a pressurization member are provided. In the heating roll 264, a heating source 264B is provided.

A discharge roll 252 that discharges the recording medium P to which the toner image is fixed to the discharge portion 218 is provided downstream of the fixing device 260 in the transport direction.

Next, in the image forming apparatus 210, an image forming operation of forming an image on the recording medium P will be described.

In the image forming apparatus 210, the recording medium P transported from the accommodation portion 212 to the feed roll 246 is transported to the second transfer position by the plurality of transport rolls 250.

On the other hand, in each of the image forming units 222Y to 222K, the photoreceptor 232 charged by the charging device 223 is exposed by the exposure device 236 to form a latent image on the photoreceptor 232. The latent image is developed by the developing device 238 to form a toner image on the photoreceptor 232. The toner images of the colors formed by the image forming units 222Y to 222K overlap each other on the intermediate transfer belt 224 at the first transfer position such that a color image is formed. The color image formed on the intermediate transfer belt 224 is transferred to the recording medium P at the second transfer position.

The recording medium P to which the toner image is transferred is transported to the fixing device 260, and the transferred toner image is fixed by the fixing device 260. The recording medium P to which the toner image is fixed is discharged to the discharge portion 218 by the discharge roll 252. As described above, the series of image forming operations are performed.

The image forming apparatus 210 according to the present exemplary embodiment is not limited to the above-described configuration. For example, well-known image forming apparatus such as a direct transfer type image forming apparatus that directly transfers the toner image formed on each of the photoreceptors 232 of the image forming units 222Y to 222K to the recording medium P may be adopted.

EXAMPLES

Hereinafter, Examples of the present invention will be described, but the present invention is not limited to these Examples. In the following description, unless specified otherwise, "part(s)" and "%" represent "part(s) by mass" and "mass %".

Example 1

Formation of Conductive Elastic Layer 15 parts by mass of a conductive agent (carbon black, ASAHI THERMAL manufactured by Asahi Carbon Co., Ltd.), 1 part by mass of a vulcanizing agent (sulfur, 200-mesh, manufactured by Tsurumi Chemical Industry Co., Ltd.) as an additive to be blended in the conductive elastic layer, 1.0 part of stearic acid as a processing aid, and 5.0 parts of zinc oxide as a vulcanization accelerator are added to 100 parts by mass of an elastic material (epichlorohydrin-ethylene oxide-allyl glycidyl ether copolymer rubber) to obtain a mixture, and the mixture is kneaded in an open roll to obtain a composition for forming a conductive elastic layer. The composition for forming a conductive elastic layer is wound around an outer peripheral surface of a shaft (substrate) having a diameter of 8 mm formed of SUS 303 using a press forming machine through an adhesive layer, is put into a furnace at a temperature of 180° C., and is heated for 30 minutes to form a conductive elastic layer having a thickness of 2.5 mm on the shaft. The outer peripheral surface of the conductive elastic layer is polished to obtain a conductive elastic roll having a diameter of 12 mm that includes the conductive elastic layer having a thickness of 2.0 mm.

Formation of Surface Layer

A composition for forming a first layer and a composition for forming a second layer having the following compositions are prepared.

Composition for Forming First Layer

Binder resin: methoxymethylated nylon (trade name: FR101, manufactured by Namariichi Co., Ltd., cross-linkable functional group: methoxymethyl group): 100 parts Conductive agent: carbon black (volume-average particle size: 43 nm, trade name: MONARCH 1000, manufactured by Cabot Corporation): 13 parts Solvent: methanol: 600 parts Composition for Forming Second Layer Binder resin: methoxymethylated nylon (trade name: FR101, manufactured by Namariichi Co., Ltd., cross-linkable functional group: methoxymethyl group): 100 parts Filler: polyamide particles (volume-average particle size: 5 μm, trade name: Orgasol 2001UD Nat1, manufactured by Arkema Inc.): 20 parts Conductive agent: carbon black (volume-average particle size: 43 nm, trade name: MONARCH 1000, manufactured by Cabot Corporation): 13 parts Solvent: methanol: 600 parts The composition for forming a first layer and the composition for forming a second layer are obtained by dispersing the mixtures having the above-described compositions using a bead mill under the following conditions.

Bead material: glass

Bead diameter: 1.3 mm

Propeller rotation speed: 2000 rpm

Dispersing time: 60 minutes

A surface layer is formed in the following procedure using the prepared composition for forming a first layer and the prepared composition for forming a second layer.

First Layer Forming Step

The temperature of the composition for forming a first layer is adjusted to 18.5° C., an outer peripheral surface of the conductive elastic roll is dipped in the composition at an environmental temperature of 21° C., and the composition is held at the same temperature and dried. Next, the composition is heated and calcinated at a calcination temperature of 145° C. for a calcination time of 30 minutes to obtain a first layer precursor layer.

Second Layer Forming Step

The temperature of the composition for forming a second layer is adjusted to 18.5° C., an outer peripheral surface of the first layer precursor layer is dipped in the composition at an environmental temperature of 21° C., and the composition is held at the same temperature and dried. Next, the composition is heated and calcinated at a calcination temperature of 145° C. for a calcination time of 30 minutes. As a result, a surface layer including the first layer and the second layer is formed, and a roll member is obtained.

Examples 2 to 22 and Comparative Example 1

Roll members are obtained in the same procedure as in Example 1, except that the compositions of the composition for forming a first layer and the composition for forming a second layer are adjusted as shown in Table 1 during Formation of Surface Layer, the calcination temperature and the calcination time in First Layer Forming Step and Second Layer Forming Step are adjusted as shown in Table 1, and dipping is performed such that the thicknesses of the first layer and the second layer are adjusted as shown in Table 2.

TABLE 1

| | Formation of Surface Layer | | | | | | | | | | | |
|---|---|---|---|---|---|---|---|---|---|---|---|---|
| | Composition for Forming First Layer | | | | | | | | Composition for Forming Second Layer | | | |
| | Binder Resin | | Filler | | Conductive Agent | | Solvent | | Binder Resin | | Filler | |
| | Kind | Part(s) | Kind | Part(s) | Kind | Part(s) | Kind | Part(s) | Kind | Part(s) | Kind | Part(s) |
| Example 1 | FR101 | 100 | — | 0 | CB | 13 | MeOH | 600 | FR101 | 100 | PA Particles | 20 |
| Example 2 | FR101 | 100 | — | 0 | CB | 13 | MeOH | 600 | FR101 | 100 | PA Particles | 20 |
| Example 3 | FR101 | 100 | — | 0 | CB | 13 | MeOH | 600 | FR101 | 100 | PA Particles | 20 |
| Example 4 | FR101 | 100 | PA Particles | 12 | CB | 13 | MeOH | 600 | FR101 | 100 | PA Particles | 20 |
| Example 5 | FR101 | 100 | PA Particles | 14 | CB | 13 | MeOH | 600 | FR101 | 100 | PA Particles | 20 |
| Example 6 | FR101 | 100 | — | 0 | CB | 13 | MeOH | 600 | FR101 | 100 | PA Particles | 20 |
| Example 7 | FR101 | 100 | — | 0 | CB | 13 | MeOH | 600 | FR101 | 100 | PA Particles | 20 |
| Comparative Example 1 | FR101 | 100 | PA Particles | 20 | CB | 13 | MeOH | 600 | FR101 | 100 | PA Particles | 20 |
| Example 8 | FR101 | 100 | PA Particles | 10 | CB | 13 | MeOH | 600 | FR101 | 100 | PA Particles | 20 |
| Example 9 | FR101 | 100 | PA Particles | 12 | CB | 13 | MeOH | 600 | FR101 | 100 | PA Particles | 20 |
| Example 10 | FR101 | 100 | — | 0 | CB | 13 | MeOH | 600 | FR101 | 100 | PA Particles | 20 |
| Example 11 | FR101 | 100 | — | 0 | CB | 13 | MeOH | 600 | FR101 | 100 | PA Particles | 20 |
| Example 12 | FR101 | 100 | — | 0 | CB | 13 | MeOH | 600 | FR101 | 100 | PA Particles | 20 |
| Example 13 | FR101 | 100 | — | 0 | CB | 13 | MeOH | 600 | FR101 | 100 | PA Particles | 20 |
| Example 14 | FR101 | 100 | — | 0 | CB | 13 | MeOH | 600 | FR101 | 100 | PA Particles | 20 |
| Example 15 | FR101 | 100 | — | 0 | CB | 13 | MeOH | 600 | FR101 | 100 | PA Particles | 20 |
| Example 16 | FR101 | 100 | — | 0 | CB | 13 | MeOH | 600 | FR101 | 100 | PA Particles | 20 |

TABLE 1-continued

| | | | | | | | | | | | | |
|---|---|---|---|---|---|---|---|---|---|---|---|---|
| Example 17 | FR101 | 100 | — | 0 | CB | 13 | MeOH | 600 | FR101 | 100 | PA Particles | 20 |
| Example 18 | FR101 | 100 | — | 0 | CB | 13 | MeOH | 600 | FR101 | 100 | PA Particles | 20 |
| Example 19 | FR101 | 100 | — | 0 | CB | 13 | MeOH | 600 | FR101 | 100 | PA Particles | 20 |
| Example 20 | FR101 | 100 | — | 0 | CB | 13 | MeOH | 600 | FR101 | 100 | PA Particles | 20 |
| Example 21 | FR101 | 100 | — | 0 | CB | 13 | MeOH | 600 | FR101 | 100 | PA Particles | 20 |
| Example 22 | FR101 | 100 | — | 0 | CB | 13 | MeOH | 600 | FR101 | 100 | PA Particles | 20 |

| | Formation of Surface Layer | | | | | | | |
|---|---|---|---|---|---|---|---|---|
| | Composition for Forming Second Layer | | | | First Layer Forming Step | | Second Layer Forming Step | |
| | Conductive Agent | | Solvent | | Calcination Temperature | Calcination Time | Calcination Temperature | Calcination Time |
| | Kind | Part(s) | Kind | Part(s) | ° C. | min | ° C. | min |
| Example 1 | CB | 13 | MeOH | 600 | 145 | 30 | 145 | 30 |
| Example 2 | CB | 13 | MeOH | 600 | 145 | 45 | 145 | 45 |
| Example 3 | CB | 13 | MeOH | 600 | 145 | 15 | 145 | 15 |
| Example 4 | CB | 13 | MeOF | 600 | 145 | 45 | 145 | 45 |
| Example 5 | CB | 13 | MeOH | 600 | 145 | 15 | 145 | 15 |
| Example 6 | CB | 13 | MeOH | 600 | 145 | 60 | 145 | 60 |
| Example 7 | CB | 13 | MeOH | 600 | 145 | 10 | 145 | 10 |
| Comparative Example 1 | CB | 13 | MeOH | 600 | 145 | 30 | 145 | 30 |
| Example 8 | CB | 13 | MeOH | 600 | 145 | 30 | 145 | 30 |
| Example 9 | CB | 13 | MeOH | 600 | 145 | 30 | 145 | 30 |
| Example 10 | CB | 13 | MeOH | 600 | 145 | 45 | 145 | 60 |
| Example 11 | CB | 13 | MeOH | 600 | 145 | 40 | 145 | 45 |
| Example 12 | CB | 13 | MeOH | 600 | 145 | 20 | 145 | 15 |
| Example 13 | CB | 13 | MeOH | 600 | 145 | 20 | 145 | 15 |
| Example 14 | CB | 13 | MeOH | 600 | 145 | 75 | 145 | 30 |
| Example 15 | CB | 13 | MeOH | 600 | 145 | 60 | 145 | 30 |
| Example 16 | CB | 13 | MeOH | 600 | 145 | 15 | 145 | 30 |
| Example 17 | CB | 13 | MeOH | 600 | 145 | 10 | 145 | 15 |
| Example 18 | CB | 13 | MeOH | 600 | 145 | 15 | 145 | 40 |
| Example 19 | CB | 13 | MeOH | 600 | 145 | 30 | 145 | 30 |
| Example 20 | CB | 13 | MeOH | 600 | 145 | 30 | 145 | 30 |
| Example 21 | CB | 13 | MeOH | 600 | 145 | 30 | 145 | 30 |
| Example 22 | CB | 13 | MeOH | 600 | 145 | 30 | 145 | 30 |

Abbreviations in Table 1 are as described below.

Binder Resin

FR101: methoxymethylated nylon (trade name: FR101, manufactured by Namariichi Co., Ltd., cross-linkable functional group: methoxymethyl group)

Filler

PA particles: polyamide particles (volume-average particle size: 5 μm, trade name: Orgasol 2001UD Nat1, manufactured by Arkema Inc.)

Conductive Agent

CB: carbon black (volume-average particle size: 43 nm, trade name: MONARCH 1000, manufactured by Cabot Corporation)

Solvent

MeOH: methanol

Crack Resistance Evaluation

The roll member obtained in Example or Comparative Example as a charging roll is incorporated into a modified machine of an image forming apparatus (DocuCentre-V C7776, manufactured by Fujifilm Business Innovation Corporation), and images are continuously printed.

Cracks on the surface of the charging roll are appropriately observed using an optical microscope VK (manufactured by Keyence Corporation), and the rotation speed of a photoreceptor (the diameter of the photoreceptor: 30 mm) at which a crack having a width of 10 μm or more is observed is recorded.

The results of the rotation speed of the photoreceptor are shown in Table 2.

TABLE 2

| | Conductive Elastic Layer | Surface Layer | | | | | | | | |
|---|---|---|---|---|---|---|---|---|---|---|
| | | First Layer | | | Second Layer | | | Content Ratio | | |
| | Kind of Fatty Acid Metal Salt | Degree of Cross-linking | Thermal Degradation Index | Thickness μm | Degree of Cross-linking | Thermal Degradation Index | Thickness μm | of Filler (First Layer/Second Layer × 100) mass % | Ratio (Thickness of First Layer/Thickness of Second Layer) | Crack Resistance Evaluation RPM |
| Example 1 | Zinc Stearate | 0.3 | 2.1 | 5 | 0.5 | 2.2 | 5 | 0 | 1 | 10M |

TABLE 2-continued

| | Conductive Elastic Layer Kind of Fatty Acid Metal Salt | Surface Layer: First Layer: Degree of Cross-linking | Surface Layer: First Layer: Thermal Degradation Index | Surface Layer: First Layer: Thickness μm | Surface Layer: Second Layer: Degree of Cross-linking | Surface Layer: Second Layer: Thermal Degradation Index | Surface Layer: Second Layer: Thickness μm | Surface Layer: Content Ratio of Filler (First Layer/Second Layer × 100) mass % | Surface Layer: Ratio (Thickness of First Layer/Thickness of Second Layer) | Crack Resistance Evaluation RPM |
|---|---|---|---|---|---|---|---|---|---|---|
| Example 2 | Zinc Stearate | 0.1 | 2 | 5 | 0.3 | 2.1 | 5 | 0 | 1 | 5M |
| Example 3 | Zinc Stearate | 0.5 | 2.2 | 5 | 0.7 | 2.3 | 5 | 0 | 1 | 5M |
| Example 4 | Zinc Stearate | 0.1 | 2 | 5 | 0.3 | 2.1 | 5 | 60 | 1 | 0.5M |
| Example 5 | Zinc Stearate | 0.5 | 2.2 | 5 | 0.7 | 2.3 | 5 | 70 | 1 | 0.1M |
| Example 6 | Zinc Stearate | 0.05 | 1.9 | 5 | 0.2 | 2.05 | 5 | 0 | 1 | 1M |
| Example 7 | Zinc Stearate | 0.6 | 2.3 | 5 | 0.8 | 2.4 | 5 | 0 | 1 | 0.3M |
| Comparative Example 1 | Zinc Stearate | 0.3 | 2.1 | 5 | 0.5 | 2.2 | 5 | 100 | 1 | 0.01M |
| Example 8 | Zinc Stearate | 0.3 | 2.1 | 5 | 0.5 | 2.2 | 5 | 50 | 1 | 4M |
| Example 9 | Zinc Stearate | 0.3 | 2.1 | 5 | 0.5 | 2.2 | 5 | 60 | 1 | 0.5M |
| Example 10 | Zinc Stearate | 0.1 | 2 | 5 | 0.2 | 2.05 | 5 | 0 | 1 | 2M |
| Example 11 | Zinc Stearate | 0.2 | 2 | 5 | 0.3 | 2.1 | 5 | 0 | 1 | 5M |
| Example 12 | Zinc Stearate | 0.4 | 2 | 5 | 0.7 | 2.3 | 5 | 0 | 1 | 4M |
| Example 13 | Zinc Stearate | 0.3 | 2 | 5 | 0.8 | 2.4 | 5 | 0 | 1 | 1M |
| Example 14 | Zinc Stearate | 0.05 | 1.9 | 5 | 0.3 | 2.1 | 5 | 0 | 1 | 0.5M |
| Example 15 | Zinc Stearate | 0.1 | 2 | 5 | 0.5 | 2.2 | 5 | 0 | 1 | 6M |
| Example 16 | Zinc Stearate | 0.5 | 2.2 | 5 | 0.5 | 2.2 | 5 | 0 | 1 | 8M |
| Example 17 | Zinc Stearate | 0.6 | 2.25 | 5 | 0.7 | 2.3 | 5 | 0 | 1 | 1M |
| Example 18 | Zinc Stearate | 0.5 | 2.2 | 5 | 0.4 | 2.15 | 5 | 0 | 1 | 2M |
| Example 19 | Zinc Stearate | 0.3 | 2.1 | 3 | 0.5 | 2.2 | 7.5 | 0 | 0.4 | 2M |
| Example 20 | Zinc Stearate | 0.3 | 2.1 | 3.3 | 0.5 | 2.2 | 6.6 | 0 | 0.5 | 5M |
| Example 21 | Zinc Stearate | 0.3 | 2.1 | 6.6 | 0.5 | 2.2 | 3.3 | 0 | 2 | 5M |
| Example 22 | Zinc Stearate | 0.3 | 2.1 | 6.3 | 0.5 | 2.2 | 3 | 0 | 2.1 | 4M |

The description in Table 1 will be described below.

Content Ratio of Filler (First Layer/Second Layer×100): the content of the filler in the first layer to the content of the filler in the second layer Ratio (Thickness of First layer/Thickness of Second Layer): a ratio of a thickness of the first layer to a thickness of the second layer (the thickness of the first layer/the thickness of the second layer)

It can be seen from the above results that, in the roll member according to Example, in a case where the roll member continuously rotates in a state where the roll member is pressed against another object, the formation of cracks in the surface layer is suppressed.

(((1)))

A roll member comprising:

a conductive elastic layer that contains a fatty acid metal salt; and a surface layer that is provided on the conductive elastic layer and contains a filler, wherein the surface layer includes a first layer provided on the conductive elastic layer side and a second layer provided immediately above the first layer, and a content of the filler in the first layer is less than a content of the filler in the second layer.

(((2)))

The roll member according to (((1))), wherein the fatty acid metal salt is zinc stearate.

(((3)))

The roll member according to (((1))) or (((2))), wherein the content of the filler in the first layer is less than 50 mass % with respect to the content of the filler in the second layer.

(((4)))

The roll member according to any one of (((1))) to (((3))), wherein a degree of crosslinking defined by the following Expression (1) is 0.3 or more and 0.7 or less in the second layer and is 0.1 or more and 0.5 or less in the first layer, $$\text{the degree of crosslinking}=\text{an absorbance at } 1078\ \text{cm}^{-1} \div \text{an absorbance at } 2935\ \text{cm}^{-1}. \qquad \text{Expression (1):}$$

(((5)))

The roll member according to (((4))), wherein the degree of crosslinking defined by Expression (1) in the first layer is less than the degree of crosslinking defined by Expression (1) in the second layer.

(((6)))

The roll member according to any one of (((1))) to (((5))), wherein a thermal degradation index defined by the following Expression (2) in the first layer is less than the thermal degradation index by Expression (2) in the second layer, the thermal degradation index=an absorbance at 1638 cm$^{-1}$÷an absorbance at 1543 cm$^{-}$ Expression (2):

(((7)))

The roll member according to (((6))), wherein the thermal degradation index of the first layer is 2.0 or more and 2.2 or less.

(((8)))

The roll member according to any one of (((1))) to (((7))), wherein a ratio of a thickness of the first layer to a thickness of the second layer (the thickness of the first layer/the thickness of the second layer) is 0.5 or more and 2.0 or less.

(((9)))

A charging member consisting of the roll member according to any one of (((1))) to (((8))).

(((10)))

A charging device comprising:

the charging member according to (((9))).

(((11)))

A process cartridge comprising:

the charging device according to (((10))), wherein the process cartridge is attached to and detached from an image forming apparatus.

(((12)))

An image forming apparatus comprising:

an image carrier;

the charging device according to (((10))) that charges a surface of the image carrier;

an electrostatic latent image forming device that forms an electrostatic latent image on the charged surface of the image carrier;

a developing device that develops the electrostatic latent image formed on the surface of the image carrier with a developer containing toner to form a toner image; and a transfer device that transfers the toner image to a surface of a recording medium.

The foregoing description of the exemplary embodiments of the present invention has been provided for the purposes of illustration and description. It is not intended to be exhaustive or to limit the invention to the precise forms disclosed. Obviously, many modifications and variations will be apparent to practitioners skilled in the art. The embodiments were chosen and described in order to best explain the principles of the invention and its practical applications, thereby enabling others skilled in the art to understand the invention for various embodiments and with the various modifications as are suited to the particular use contemplated. It is intended that the scope of the invention be defined by the following claims and their equivalents.

What is claimed is:

1. A roll member comprising:

a conductive elastic layer that contains a fatty acid metal salt; and a surface layer that is provided on the conductive elastic layer and contains a filler, wherein the surface layer includes a first layer provided on the conductive elastic layer side and a second layer provided immediately above the first layer, and a content of the filler in the first layer is less than a content of the filler in the second layer.

2. The roll member according to claim 1, wherein the fatty acid metal salt is zinc stearate.

3. A charging member consisting of the roll member according to claim 2.

4. A charging device comprising:

the charging member according to claim 3.

5. The roll member according to claim 1, wherein the content of the filler in the first layer is less than 50 mass % with respect to the content of the filler in the second layer.

6. A charging member consisting of the roll member according to claim 5.

7. The roll member according to claim 1, wherein a degree of crosslinking defined by the following Expression (1) is 0.3 or more and 0.7 or less in the second layer and is 0.1 or more and 0.5 or less in the first layer, the degree of crosslinking=an absorbance at 1078 cm$^{-1}$÷an absorbance at 2935 cm$^{-1}$ Expression (1).

8. The roll member according to claim 7, wherein the degree of crosslinking defined by Expression (1) in the first layer is less than the degree of crosslinking defined by Expression (1) in the second layer.

9. A charging member consisting of the roll member according to claim 8.

10. A charging member consisting of the roll member according to claim 7.

11. The roll member according to claim 1, wherein a thermal degradation index defined by the following Expression (2) in the first layer is less than the thermal degradation index by Expression (2) in the second layer, the thermal degradation index=an absorbance at 1638 cm$^{-1}$÷an absorbance at 1543 cm$^{-1}$ Expression (2).

12. The roll member according to claim 11, wherein the thermal degradation index of the first layer is 2.0 or more and 2.2 or less.

13. A charging member consisting of the roll member according to claim 12.

14. A charging member consisting of the roll member according to claim 11.

15. The roll member according to claim 1, wherein a ratio of a thickness of the first layer to a thickness of the second layer (the thickness of the first layer/the thickness of the second layer) is 0.5 or more and 2.0 or less.

16. A charging member consisting of the roll member according to claim 15.

17. A charging member consisting of the roll member according to claim 1.

18. A charging device comprising:

the charging member according to claim 17.

19. A process cartridge comprising:

the charging device according to claim 18, wherein the process cartridge is attached to and detached from an image forming apparatus.

20. An image forming apparatus comprising:

an image carrier;

the charging device according to claim 18 that charges a surface of the image carrier;

an electrostatic latent image forming device that forms an electrostatic latent image on the charged surface of the image carrier;

a developing device that develops the electrostatic latent image formed on the surface of the image carrier with a developer containing toner to form a toner image; and a transfer device that transfers the toner image to a surface of a recording medium.

* * * * *